Patented June 26, 1923.

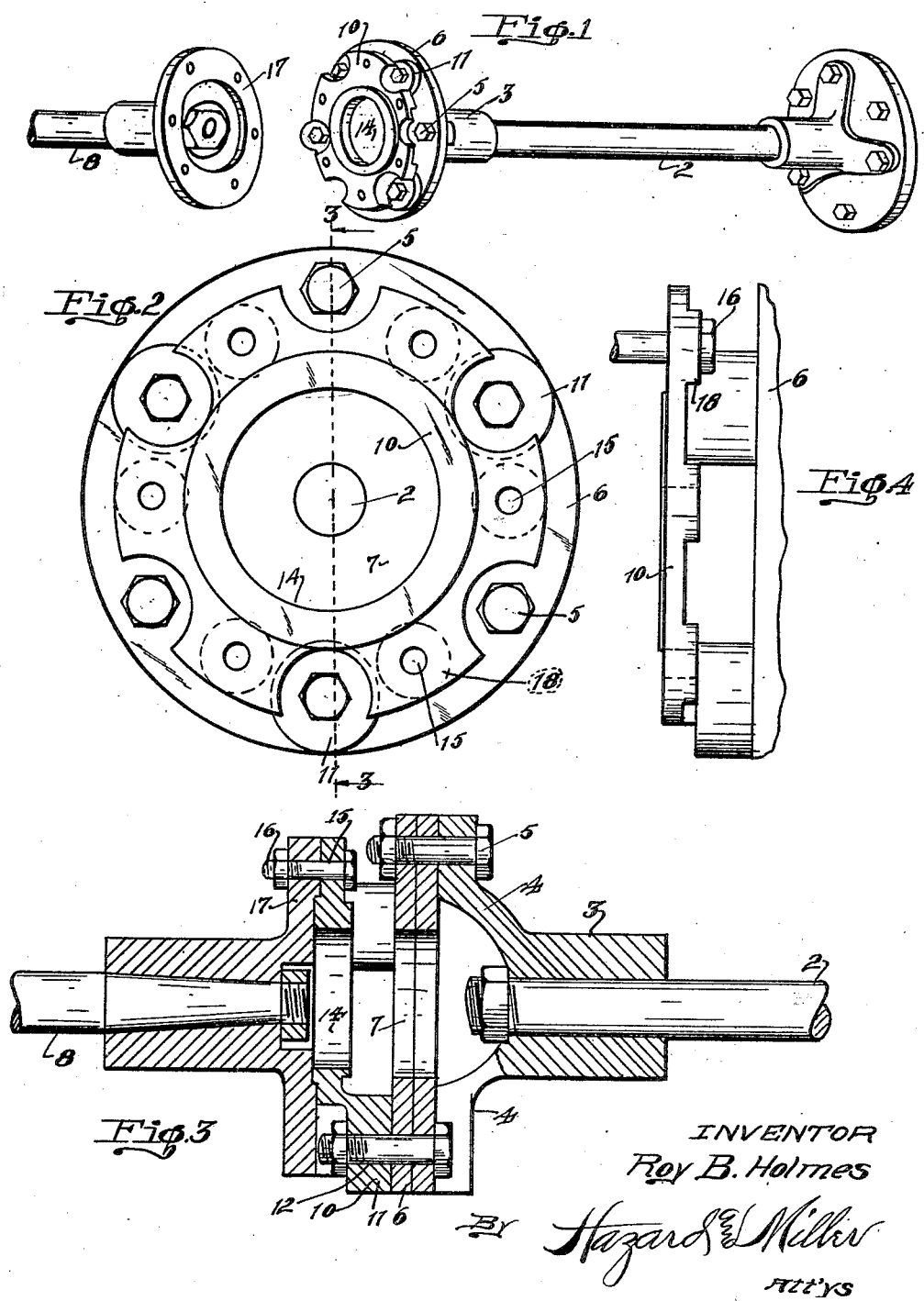

1,460,337

UNITED STATES PATENT OFFICE.

ROY B. HOLMES, OF LOS ANGELES, CALIFORNIA; NELLIE I. HOLMES, ADMINISTRATRIX OF SAID ROY B. HOLMES, DECEASED, ASSIGNOR, BY MESNE ASSIGNMENTS, TO A. W. SALINE.

FLEXIBLE COUPLING.

Application filed November 22, 1919, Serial No. 339,984. Renewed December 29, 1922.

*To all whom it may concern:*

Be it known that I, ROY B. HOLMES, a citizen of the United States, residing at Los Angeles, in the county of Los Angeles and State of California, have invented new and useful Improvements in Flexible Couplings, of which the following is a specification.

This invention relates to power transmitting apparatus and particularly to flexible joints, and has for its object to provide a flexible coupling betwen co-ordinate shafts whereby the shafts can be relatively separated or disconnected from each other with a minimum requirement of time by the removal of a few simple bolts and in a manner that will enable the disassembly of the parts without necessitating the taking apart of the organization, such for instance as automobiles, in order to secure the removal of, for instance, the propeller shaft.

Another object is to provide a flexible coupling that is of comparatively light weight, is inexpensive in cost of manufacture and in which the parts are readily removable and interchangeable for repairs when necessary.

The invention consists of the construction and details an embodiment of which is illustrated in the accompanying drawings and described and claimed herein.

Figure 1 is a perspective of a propeller shaft or intermediate section disconnected from one end of a co-ordinate or transmission shaft.

Fig. 2 is a side elevation or face view of the improved coupling.

Fig. 3 is a section on line 3—3 of Fig. 2.

Fig. 4 is an edge view of the coupling.

The illustrated embodiment of the invention includes a section 2 of shafting as for instance the propeller shaft of an automobile on each end of which there is mounted a hub 3 having, in this case, radial arms 4 this forming what is commonly termed a "spider" the outer ends of which are perforated so as to receive bolts 5 passing through a flexible disc 6 of any suitable material which is preferably centrally apertured as at 7 to permit the passage of a shaft if necessary.

An important feature of the present invention is the provision of means whereby the flexible joint comprising, for instance, the member 3—4 fastened on the shaft 2 with the flexible disc 6 can be readily connected to a co-ordinate driving or driven shaft as for instance the transmission shaft 8, Fig. 3, and especially to secure this connection without necessitating the removal of the fastening means passing through the disc and part 4.

To that end my improved coupling embodies an intermediate connecting plate or member 10 which, preferably, is provided at suitable angular distance around one face with a series of bosses or lugs 11 perforated at 12 to receive fastening bolts corresponding to the bolts 5 fastening the member 4 to the disc 6. The intermediate plate or connecting member 10 is preferably centrally provided with an opening 14 to permit the passage of a shaft or access therethrough, and this plate is provided with a series of bolt receiving apertures 15 for bolts 16 by which it may be fastened face to face with a spider or other member 17 appropriately mounted on the adjacent end of the transmission shaft 8. The length of the bosses or hubs 11 is preferably sufficient to space the inside face of the fastening plate 10 from the adjacent side of the disc 6 so as to provide clearance for the nuts of the bolts 5.

It is preferably for the purpose of securing lightness of construction that the connecting plate 10 be made comparatively thin and yet of desired strength and the fastening bolts 15 may pass through outwardly projecting bosses 18 formed on the inner face of the member 10 this providing the desired strength and rigidity of the connecting parts.

It will be understood that this type of joint may be used in the flexible connecting of any type of shafting, and in the case of automobile propeller shafts one of these complete joints including the fastening member 3—4 on the shaft, the disc 6 and the connecting plate 10 would be mounted for permanent connection upon each end of the propeller shaft, so that the latter will be assembled, shipped and installed as a unit by the simple bolting up of the end clamping plates 10 to the respective adjacent connecting members 17 on the shafts co-ordinate thereto.

It is understood that the term flexible disc, as used herein, is intended to cover the flexible transmitting device whether of one or more members used to connect the devices on the opposite faces of the flexible transmitting device.

Various changes may be made without departing from the spirit of my invention as claimed.

I claim:

1. A flexible coupling for shafts comprising a coupling member adapted to be applied to one of the shafts, a flexible disc positioned adjacent to said coupling member, bolts seated in said coupling member and said flexible disc, an intermediate plate, lugs formed integral with and projecting from one side of said intermediate plate, which lugs maintain said intermediate plate spaced apart from the flexible disc, fastening means seated in said flexible disc and said lugs, the edge of said intermediate plate having notches formed therein to provide clearance for the bolts that fasten the flexible disc to the first mentioned coupling member, a coupling member adapted to be secured to the other shaft and means for securing the intermediate plate to the last mentioned coupling member.

2. The combination with a pair of alined shafts and coupling members positioned there upon, of a plate directly connected to one of said coupling members, lugs integral with and projecting outwardly from the outer face of said plate, a flexible disc bearing against the outer faces of said lugs, fastening means passing through said lugs and through said flexible disc, and there being notches formed in the edge of said plate between the lugs to provide clearance for parts of the last mentioned fastening means and fastening means passing through said flexible disc and through the other one of the coupling members.

3. A coupling for shaft sections, comprising a plate attachable to a shaft end and having lugs projecting outwardly around its margin, and a flexible disc secured to lateral faces of said lugs; the plate being notched in its margin between the lugs to provide clearance for fastening means by which the disc is attachable to a respective shaft end.

In testimony whereof I have signed my name to this specification.

ROY B. HOLMES.